(12) United States Patent
Chen

(10) Patent No.: US 11,368,864 B2
(45) Date of Patent: Jun. 21, 2022

(54) CHANNEL STATE INFORMATION REPORTING METHOD AND RELATED EQUIPMENT

(71) Applicant: GUANGDONG OPPO MOBILE TELECOMMUNICATIONS CORP., LTD., Guangdong (CN)

(72) Inventor: Wenhong Chen, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 114 days.

(21) Appl. No.: 16/637,907

(22) PCT Filed: Aug. 18, 2017

(86) PCT No.: PCT/CN2017/098096
§ 371 (c)(1),
(2) Date: Feb. 10, 2020

(87) PCT Pub. No.: WO2019/033403
PCT Pub. Date: Feb. 21, 2019

(65) Prior Publication Data
US 2020/0178096 A1 Jun. 4, 2020

(51) Int. Cl.
*H04L 12/26* (2006.01)
*H04W 24/08* (2009.01)
(Continued)

(52) U.S. Cl.
CPC .......... *H04W 24/08* (2013.01); *H04B 7/0456* (2013.01); *H04B 7/063* (2013.01); *H04B 7/0626* (2013.01); *H04B 7/0632* (2013.01)

(58) Field of Classification Search
CPC ... H04W 24/08; H04B 7/0456; H04B 7/0626; H04B 7/063; H04B 7/0632; H04B 7/0639; H04L 1/0026
(Continued)

(56) References Cited

U.S. PATENT DOCUMENTS 8,675,558 B2 * 3/2014 Zhu ................. H04L 5/0023
370/328
2012/0039207 A1 * 2/2012 Eriksson ............ H04L 1/0015
370/252
(Continued)

FOREIGN PATENT DOCUMENTS

CL 202000352 A 6/2020
CL 202000354 A 6/2020
(Continued)

OTHER PUBLICATIONS

English Translation of International Search Report for PCT/CN2017/098096 dated May 3, 2018.
(Continued)

*Primary Examiner* — Helene E Tayong
(74) *Attorney, Agent, or Firm* — Young Basile Hanlon & MacFarlane, P.C.

(57) ABSTRACT

Disclosed are a channel state information reporting method and related equipment. The method comprises: terminal equipment determines a CQI measurement mode used in a CSI reporting mode without a PMI; the terminal equipment performs CQI estimation based on the CQI measurement mode, and reports the estimated CQI to network equipment; the network equipment receives the CQI reported by the terminal equipment.

8 Claims, 5 Drawing Sheets

(51) Int. Cl.
  *H04B 7/0456* (2017.01)
  *H04B 7/06* (2006.01)
(58) Field of Classification Search
  USPC .......................................................... 370/252
  See application file for complete search history.

(56) References Cited

U.S. PATENT DOCUMENTS

| 2013/0315081 A1 | 11/2013 | Kim et al. |
| 2013/0343299 A1 | 12/2013 | Sayana et al. |
| 2015/0288433 A1 | 10/2015 | Onggosanusi et al. |

FOREIGN PATENT DOCUMENTS

| CN | 102082636 A | 6/2011 |
| CN | 103378928 A | 10/2013 |
| CN | 106685493 A | 5/2017 |
| CN | 106685502 A | 5/2017 |
| KR | 20130130593 A | 12/2013 |
| KR | 20150031242 A | 3/2015 |
| RU | 2584145 C2 | 5/2016 |

OTHER PUBLICATIONS

China Office Action with English Translation for CN Application 202010081157.7 dated Nov. 3, 2020.
Russia Office Action with English Translation for RU Application 2020107328/07(011725) dated Sep. 3, 2020.
Extended European Search Report for EP Application 17921866.4 dated Jun. 22, 2020.
3GPP TSG RAN WG1 Meeting #81; Fukuoka, Japan, May 25-29, 2015; Rt-153390.
3GPP TSG RAN WG1 #90 R1-1714245; Prague, Czech Republic, Aug. 21-25, 2017.
3GPP TSG-RAN WG1 #90 R1-1714281; Prague, Czech Republic, Aug. 21-25, 2017.
Canadian Office Action for CA Application 3,072,140 dated Jun. 10, 2021. (4 pages).
Chile Office Action with English Translation for CL Application 2020-00351 dated Jun. 17, 2021. (21 pages).
Chinese Office Action with English Translation for CN Application 202010081157.7 dated Apr. 12, 2021. (22 pages).
Indian Examination Report for IN Application 202017005212 dated May 24, 2021. (6 pages).
Korean Office Action with English Translation for KR Application 10-2020-7003576 dated May 10, 2021. (11 pages).
Russian Decision on grant a patent for invention with English Translation for RU Application 2020107328 dated May 18, 2021. (21 pages).
Communication pursuant to Article 94(3) EPC Exam for EP Application 17921866.4 dated Mar. 15, 2021.
Russia 2nd Office Action with English Translation for RU Application 2020107328/07(011725) dated Jan. 31, 2021.
3GPP TSG RAN WG1 NR AH Meeting Spokane, USA, R1-1700912, Samsung, Codebook design framework for NR MIMO, 16th Jan. 20, 2017.
3GPP TSG RAN WG1 NR Ad-Hoc#2 Qingdao, P.R. China, R1-1710668, Samsung, Discussions on CSI measurements and reporting for NR, Jun. 27-30, 2017.
3GPP TSG RAN WG1 Meeting #90 Prague, Czechia, R1-1713810, ETRI, Discussion on beam reporting for CSI acquisition, Aug. 21-25, 2017.
3GPP TSG-RAN WG2 Meeting #98 Tdoc Hangzhou, China, R2-1704102, Ericsson, Beam management in NR, Apr. 15-19, 2017.
Chinese Decision of Rejection with English Translation for CN Application 202010081157.7 dated Jul. 16, 2021. (17 pages).
Summons to attend oral proceedings pursuant to Rule 115(1) EPC for EP Application 17921866.4 dated Sep. 27, 2021. (9 pages).
Japanese Notice of Reasons for Refusal with English Translation for JP Application 2020506170 dated Jul. 13, 2021. (8 pages).
Singapore Invitation to Respond to Written Opinion for SG Application 11202001023U dated Aug. 11, 2021. (6 pages).
Korean Office Action with English Translation for KR Application 1020207003576 dated Sep. 30, 2021. (4 pages).
Chile Office Action with English Translation for CL Application 2020000351 dated Oct. 15, 2021. (10 pages).
Canadian Examination Report for GA Application 3072140 dated Mar. 9, 2022. (4 pages).
Chinese Office Action with English Translation for CN Application 202010081157.7 dated Mar. 25, 2022. (15 pages).
Japanese Office Action with English Translation for JP Application 2020506170 dated Feb. 25, 2022. (5 pages).
Taiwan Office Action with English Translation for TW Application 107128884 dated Jan. 20, 2022. (21 pages).

* cited by examiner

CHANNEL STATE INFORMATION REPORTING METHOD AND RELATED EQUIPMENT

CROSS-REFERENCE TO RELATED APPLICATION(S)

This application is a 371 application of International Application No. PCT/CN2017/098096, filed on Aug. 18, 2017, the entire disclosure of which is hereby incorporated by reference.

TECHNICAL FIELD

The present application relates to the technical field of communication, in particular to a method for reporting channel state information and related devices.

BACKGROUND

In the field of wireless communication, channel state information (CSI) is a channel attribute of a communication link. The CSI describes a fading factor of a signal on each transmission path. The CSI may enable a communication system to adapt to a current channel condition and provide guarantee for high reliability and high speed communication in a multi-antenna system. The CSI is information reported by a user equipment (UE) to a network device, and includes channel quality indicator (CQI), Rank Indication (RI), precoding matrix indicator (PMI), and the like.

In downlink transmission based on channel reciprocity, a terminal device may not report a PMI but only a CQI and other channel information, and this CSI reporting mode is called a CSI reporting mode without PMI reporting. In the CSI reporting mode without PMI reporting, a network device acquires downlink channel information based on channel reciprocity and a channel Sounding Reference Signal (SRS), and then calculates a downlink precoding matrix based on the acquired downlink channel information.

SUMMARY

Implementations of the present application provide a method for reporting channel state information and related devices.

In a first aspect, an implementation of the present application provides a method for reporting channel state information (CSI), including: determining, by a terminal device, a channel quality indicator (CQI) measurement mode to be used under a CSI reporting mode without precoding matrix indicator (PMI); and performing, by the terminal device, CQI estimation based on the CQI measurement mode and reporting an estimated CQI to a network device.

In a second aspect, an implementation of the present application provides a method for reporting channel state information (CSI), including: receiving, by a network device, channel quality indicator (CQI) reported from a terminal device, wherein the CQI is acquired by the terminal device through performing CQI estimation according to a CQI measurement mode under a CSI reporting mode without precoding matrix indicator (PMI).

In a third aspect, an implementation of the present application provides a terminal device including a processing unit and a communication unit, wherein: the processing unit is configured to determine a channel quality indicator (CQI) measurement mode to be used under a channel state information (CSI) reporting mode without precoding matrix indicator (PMI), perform CQI estimation based on the CQI measurement mode, and report an estimated CQI to a network device through the communication unit.

In a fourth aspect, an implementation of the present application provides a network device including a processing unit and a communication unit, wherein: the processing unit is configured to receive channel quality indicator (CQI) reported from a terminal device through the communication unit, wherein the CQI is acquired by the terminal device through performing CQI estimation according to a CQI measurement mode under a channel state information (CSI) reporting mode without precoding matrix indicator (PMI).

In a fifth aspect, an implementation of the present application provides a terminal device including one or more processors, one or more memories, one or more transceivers, and one or more programs; wherein the one or more programs are stored in the one or more memories and configured to be executed by the one or more processors, and the one or more programs include instructions for executing acts in the method as described in the first aspect.

In a sixth aspect, an implementation of the present application provides a network device including one or more processors, one or more memories, one or more transceivers, and one or more programs; wherein the one or more programs are stored in the one or more memories and configured to be executed by the one or more processors, and the one or more programs include instructions for executing acts in the method as described in the second aspect.

In a seventh aspect, an implementation of the present application provides a computer readable storage medium storing computer programs for electronic data interchange, wherein the computer programs cause a computer to execute the method as described in the first aspect.

In an eighth aspect, an implementation of the present application provides a computer readable storage medium storing computer programs for electronic data interchange, wherein the computer programs cause a computer to execute the method as described in the second aspect.

In a ninth aspect, an implementation of the present application provides a computer program product. The computer program includes a non-transitory computer readable storage medium storing computer programs, and the computer programs are operable to cause a computer to execute the method as described in the first aspect.

In a tenth aspect, an implementation of the present application provides a computer program product. The computer program includes a non-transitory computer readable storage medium storing computer programs, and the computer programs are operable to cause a computer to execute the method as described in the second aspect.

These aspects and other aspects of the present application will be more simply understood in following description of the implementations.

BRIEF DESCRIPTION OF DRAWINGS

To describe technical solutions in implementations of the present application or the related art more clearly, accompanying drawings that need to be used in the description of implementations or the related art will be briefly introduced below. It is apparent that the accompanying drawings described below are only some implementations of the present application; and for a person of ordinary skill in the art, other drawings may be obtained according to these drawings without paying an inventive effort.

DETAILED DESCRIPTION

The technical solutions of the present application are clearly and completely described with reference to the accompanying drawings, in order to make the technical solutions of the present application more clearly understood by those skilled in the art. The described implementations are only part, but not all, of the implementations of the present application. Based on the implementations of the present application, all other implementations acquired by those skilled in the art without creative work are within the scope of the present application.

Details will be illustrated respectively in following.

The terms "first", "second", "third" and "fourth", or the like in the description, claims and drawings of the present application are used to distinguish different objects, but not used to describe a specific order. In addition, the terms "include" and "have" and any variations thereof are intended to cover non-exclusive inclusion. For example, a process, method, system, product, or device that includes a series of acts or units is not limited to the listed acts or units, but optionally also includes acts or units that are not listed, or optionally also includes other acts or units that are inherent to the process, method, product, or device.

The "implementation" mentioned in this disclosure means that a particular feature, structure, or characteristic described in combination with the implementation may be included in at least one implementation of the present application. The appearance of the phrase in various places in the specification does not necessarily refer to the same implementation, nor is it an independent or alternative implementation mutually exclusive with other implementations. It is explicitly and implicitly understood by one skilled person in the art that implementations described in this disclosure may be combined with other implementations.

Implementations of the present application will be described below with reference to the accompanying drawings.

Figure 1:
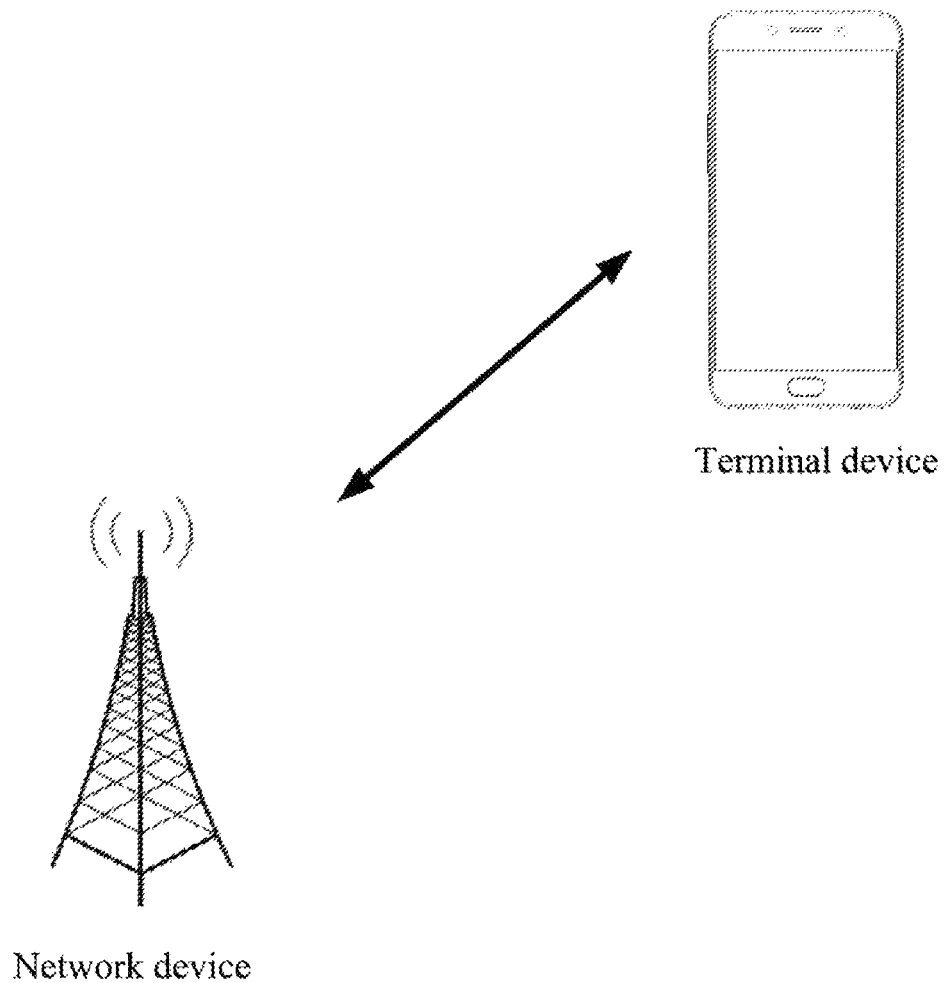
FIG. 1 is a schematic diagram of network architecture according to an implementation of the present application.

Referring to FIG. 1, FIG. 1 is a schematic diagram of network architecture disclosed in an implementation of the present application. The network architecture shown in FIG. 1 includes a terminal device and a network device. The terminal device and the network device establish connection through a wireless signal. After the connection is established, the terminal device performs uplink transmission to the network device through a wireless signal, for example, the terminal device reports CSI etc., to the network device, and the network device performs downlink transmission to the terminal device through a wireless signal, e.g., the network device transmits a signaling to the terminal device.

In a CSI reporting mode without PMI reporting, a network device acquires downlink channel information based on channel reciprocity and an SRS, and then the network device calculates a downlink precoding matrix based on the acquired downlink channel information. Since the channel reciprocity of the network device may be ideal or non-ideal, accuracy of the downlink channel information acquired by the network device according to the channel reciprocity is difficult to guarantee. Under conditions of reliabilities of different channel reciprocity, if a terminal device uses the same measurement mode to estimate channel state information (such as RI/CQI), this may lead to inaccurate channel state information estimated by the terminal device in some scenarios.

In order to solve the above problem, in the present application, a terminal device and a network device pre-agree at least one CQI measurement mode for CQI estimation under a CSI reporting mode without PMI. Before performing CQI estimation, the terminal device firstly determines a CQI measurement mode to be used currently under the CSI reporting mode without PMI; then the terminal device performs CQI estimation based on the determined CQI measurement mode, and finally the terminal device feeds back the estimated CQI to the network device.

It may be seen that, compared with the related art, in the present application, there may be more than one CQI measurement mode for CQI estimation under a CSI reporting mode without PMI. In different scenarios, CQI measurement modes determined by the terminal device to be used under the CSI reporting mode without PMI may be different, thereby trying to avoiding a problem of inaccurate CQI estimation in some scenarios caused by adopting the same CQI measurement mode by the terminal device in different scenarios, and further improving accuracy of channel state information.

The terminal device is a device that provides voice and/or data connectivity to a user, such as a handheld device with a wireless connection function, a vehicle-mounted device. Common terminal devices include, for example, mobile phones, tablet computers, notebook computers, palm computers, mobile internet devices (MIDs), wearable devices such as smart watches, smart bracelets, pedometers, etc.

The network device refers to a node device on a network side. For example, the network device may be a Radio Access Network (RAN) device on an access network side in a cellular network. The so-called RAN device is a device that connects a terminal device to a wireless network, including but not limited to: an Evolved Node B (eNB), a radio network controller (RNC), a Node B (NB), a Base Station Controller (BSC), a Base Transceiver Station (BTS), a Home Base Station (e.g., a Home evolved NodeB, a Home Node B (HNB)), a Base Band Unit (BBU), or a Mobility Management Entity (MME). For another example, the network device may be a node device in a Wireless Local Area Network (WLAN), such as an access controller (AC), a gateway, or a WIFI Access Point (AP).

A method for reporting channel state information (CSI) according to an implementation of the present application will be described in detail below with reference to the network architecture shown in FIG. 1.

Figure 2:
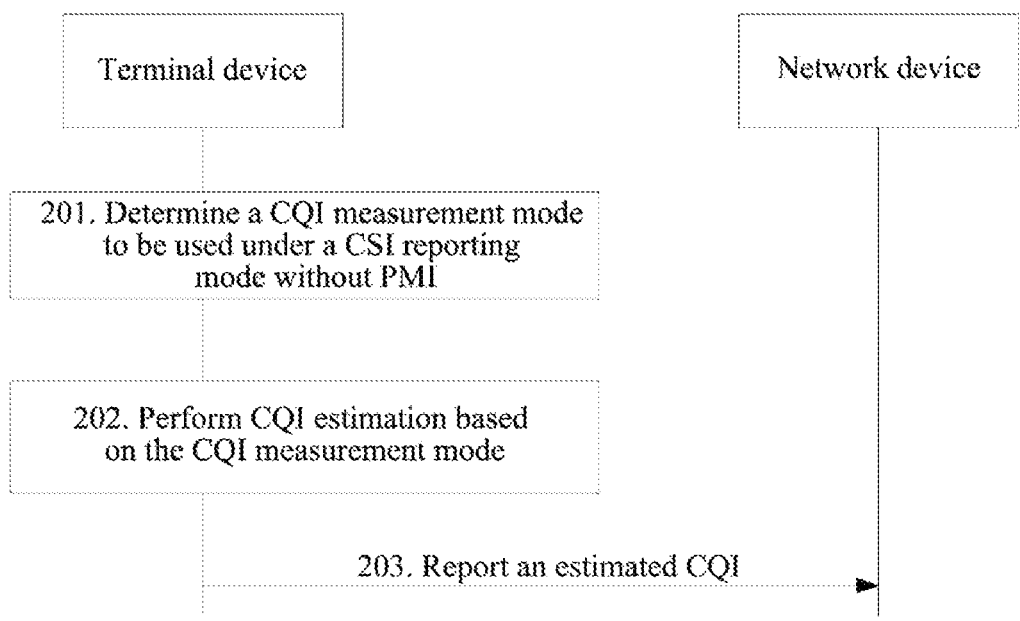
FIG. 2 is a flowchart of a method for reporting channel state information according to an implementation of the present application.

Referring to FIG. 2, which is a flowchart of a method for reporting channel state information according to an implementation of the present application. The method includes acts 201-203.

In act 201: a terminal device determines a CQI measurement mode to be used under a CSI reporting mode without PMI.

Specifically, the terminal device and a network device pre-agree at least one CQI measurement mode for the CQI estimation under the CSI reporting mode without PMI. The CQI measurement mode is: a first CQI measurement mode for CQI estimation based on a precoding matrix in a codebook; a second CQI measurement mode for CQI estimation only based on an interference measurement result; a third CQI measurement mode for CQI estimation based on downlink channel information corresponding to part of downlink receiving antennas; or, a fourth CQI measurement mode for CQI estimation based on a beamformed CSI-RS port. The at least one CQI measurement mode is at least one of the first CQI measurement mode, the second CQI measurement mode, the third CQI measurement mode, and the fourth CQI measurement mode.

In act 202: the terminal device performs CQI estimation based on the determined CQI measurement mode under the CSI reporting method without PMI.

In act 203: the terminal device reports an estimated CQI to a network device; and the network device receives the CQI reported from the terminal device.

It can be seen that, compared with the related art, in the present application, there may be more than one CQI measurement mode for CQI estimation under the CSI reporting mode without PMI. In different scenarios, the CQI measurement modes determined by the terminal device to be used in the CSI reporting mode without PMI may be different, thereby trying to avoiding a problem of inaccurate CQI estimation in some scenarios caused by adopting the same CQI measurement mode by the terminal device in different scenarios, and further improving accuracy of channel state information.

In an example, before the act 201, the method further includes: the network device sends first indication information to the terminal device, wherein the first indication information is used for indicating use of the CSI reporting mode without PMI; the terminal device receives the first indication information from the network device; and the terminal device determines to use the CSI reporting mode without PMI according to the first indication information.

Specifically, the network device sends a downlink signaling to the terminal device, and the downlink signaling carries the first indication information. The downlink signaling may be a high-layer signaling sent by the network device to the terminal device, such as a Radio Resource Control (RRC) signaling. A specific way for a RRC signaling to carry the first indication information may include: adding information of 1 bit (i.e. the first indication information) to RRC to indicate whether to use a CSI reporting mode without PMI or a CSI reporting mode with PMI. For example, when a value of the 1 bit is 1, it indicates to use the CSI reporting mode without PMI, and when a value of the 1 bit is 0, it indicates to use the CSI reporting mode with PMI. In the CSI reporting mode without PMI, the terminal device does not report PMI when reporting CSI, and the terminal device may only report CQI, or the terminal device may report CQI, RI, CSI-RS Resource Indicator (CRI) and other CSI information.

In an example, before the terminal device receives the first indication information, the terminal device may adopt a default CSI reporting mode. For example, before the terminal device receives the first indication information, the terminal device may adopt the CSI reporting mode with PMI by default; and after the terminal device receives the first indication information, the terminal device determines a CSI reporting mode without PMI to be adopted subsequently according to the first indication information.

In an example, before the act 201, the method further includes: the network device sends second indication information to the terminal device, wherein the second indication information is used for indicating the CQI measurement mode for the CQI estimation under the CSI reporting mode without PMI; the terminal device receives the second indication information from the network device; a specific implementation for the terminal device to determine the CQI measurement mode under the CSI reporting mode without PMI includes: the terminal device determines the CQI measurement mode under the CSI reporting mode without PMI from at least one CQI measurement mode according to the second indication information.

It should be noted that at least one CQI measurement mode here is the at least one CQI measurement mode described above, which will not be described here.

Specifically, the network device sends a downlink signaling to the terminal device, and the downlink signaling carries the second indication information. The downlink signaling carrying the second indication information and the downlink signaling carrying the first indication information may be the same signaling or different signalings, which are not limited here. Assuming that the downlink signaling carrying the second indication information and the downlink signaling carrying the first indication information are both an RRC signaling, a specific way of carrying the second indication information by the RRC signaling may be as follows: on a basis of carrying the first indication information by RRC, information of 2 bits (i.e., the second indication information) is added to the RRC to indicate the CQI measurement mode used for CQI estimation under the CSI reporting mode without PMI. For example, when a value of the 2 bits is 00, it indicates that the CQI measurement mode under the CSI reporting mode without PMI is the first CQI measurement mode, and when the value of the 2 bits is 01, it indicates that the CQI measurement mode under the CSI reporting mode without PMI is the second CQI measurement mode, and when the value of the 2 bits is 10, it indicates that the CQI measurement mode under the CSI reporting mode without PMI is the third CQI measurement mode, and when the value of the 2 bits is 11, it indicates that the CQI measurement mode under the CSI reporting mode without PMI is the fourth CQI measurement mode.

In an example, before the terminal device receives the second indication information, the terminal device may adopt a default CQI measurement mode. For example, before the terminal device receives the second indication information, the terminal device may adopt the second CQI measurement mode by default; after the terminal device receives the second indication information, the terminal device determines a CQI measurement mode to be adopted subsequently according to the second indication information.

In an example, if the terminal device determines that the CQI measurement mode under the CSI reporting mode without PMI is the first CQI measurement mode, before the act 201, the method further includes: the network device sends third indication information to the terminal device, wherein the third indication information is used for indicating a codebook type used for the CQI estimation under the CSI reporting mode without PMI; the terminal device receives the third indication information from the network device. A specific implementation of performing the CQI estimation by the terminal device based on the determined CQI measurement mode under the CSI reporting mode without PMI in the act S202, includes: the terminal device determines a codebook type used for CQI estimation under a CSI reporting mode without PMI reporting from at least one predefined codebook type according to the third indication information; the terminal device performs the CQI estimation according to a codebook of the codebook type.

For example, the at least one codebook type is two codebook types pre-agreed by the terminal device and the network device, and the two codebook types are, for example, Type 1 codebook and Type 2 codebook. The Type 1 codebook contains low-precision codebooks and Type 2 codebook contains high-precision quantized codebooks.

Specifically, the network device sends a downlink signaling to the terminal device, and the downlink signaling carries the third indication information. A downlink signaling carrying the third indication information, a downlink signaling carrying the second indication information, and a downlink signaling carrying the first indication information may be the same signaling or different signalings, which are not limited here. Assuming that a downlink signaling carrying the first indication information, a downlink signaling carrying the second indication information, and a downlink signaling carrying the third indication information are all an RRC signaling, a specific way of carrying the third indication information by the RRC signaling may be: on a basis of carrying the first indication information and the second indication information by RRC, adding information of 1 bit (i.e., the third indication information) to the RRC to indicate a codebook type used for the CQI estimation under the CSI reporting mode without PMI. For example, when a value of the 1 bit is 0, it indicates that a codebook type used for CQI estimation under the CSI reporting mode without PMI is Type 1 codebook, and when a value of the 1 bit is 1, it indicates that a codebook type used for CQI estimation under the CSI reporting mode without PMI is Type 2 codebook.

In an example, if the terminal device determines that the CQI measurement mode to be used under the CSI reporting mode without PMI is the first CQI measurement mode, before the act 201, the method further includes: the network device sends fourth indication information to the terminal device, wherein the fourth indication information is used for indicating a codebook used for the CQI estimation under the CSI reporting mode without PMI in at least a specified codebook type; the terminal device receives the fourth indication information from the network device. A specific implementation of performing the CQI estimation by the terminal device based on the determined CQI measurement mode under the CSI reporting mode without PMI in the act S202 includes: the terminal device determines the codebook used for the CQI estimation under the CSI reporting mode without PMI from the specified codebook type according to the fourth indication information; the terminal device performs the CQI estimation according to the codebook.

Specifically, assuming that a specified codebook type is Type 1 codebook, where different configuration parameters in the Type 1 codebook correspond to different codebooks, the fourth indication information is used for indicating a set of configuration parameters of the Type 1 codebook, and the terminal device may determine a codebook from the Type 1 codebook based on the indicated set of configuration parameters, and then the terminal device performs the CQI estimation based on the determined codebook. Configuration parameters of the codebook type may include at least one of: a quantity of antenna ports, a total quantity of beams, a sampling frequency, a quantity of beams contained in a beam group, a quantity of beam groups, a quantity of antenna array panels, and a quantity of polarizations, etc.

In an example, if the terminal device determines that the CQI measurement mode under the CSI reporting mode without PMI is the first CQI measurement mode, a specific implementation of performing the CQI estimation by the terminal device based on the determined CQI measurement mode under the CSI reporting mode without PMI in the act S202 is: the terminal device performs the CQI estimation according to a target codebook or a subset of a target codebook, and the target codebook is a codebook used by the terminal device for CSI measurement under the CSI reporting mode with PMI reporting.

In an implementation, the target codebook is a codebook used by the terminal device last time for CSI measurement under the CSI reporting mode with PMI reporting. For example, there are two records in the terminal device, and each record records a codebook used for CSI measurement under the CSI reporting mode with PMI reporting. For example, at a time point 1, a codebook 1 used by the terminal device for CSI measurement under the CSI reporting mode with PMI reporting is recorded, and at a time point 2, a codebook 2 used by the terminal device for CSI measurement under the CSI reporting mode with PMI reporting is recorded. If an interval between the time point 2 and current system time is shorter than an interval between the time point 1 and the current system time, then the codebook 2 is the target codebook.

In another implementation, the network device configures a codebook used for CSI measurement under a CSI reporting mode with PMI reporting for the terminal device through a downlink signaling (such as a high-layer signaling), and the downlink signaling is also used for configuring a codebook used for CSI measurement under a CSI reporting mode without PMI reporting, that is, it is not necessary to independently configure a codebook for the CSI reporting mode without PMI reporting. The codebook may include multiple different subsets. In this case, the two reporting modes may still use independent codebook subset restriction for CQI estimation, for example, the two reporting modes use independent codebook subset restriction indication information. For example, under a CSI reporting mode with PMI reporting, a subset 1 in a target codebook is used for CQI estimation, and under a CSI reporting mode without PMI reporting, a subset 2 in the target codebook is used for CQI estimation, and the subset 1 and the subset 2 are independent subsets in the target codebook.

It should be noted that in combination with the two examples, when the terminal device does not receive the third indication information from the network device, the terminal device uses the above target codebook or a subset of the above target codebook to perform CQI estimation. When the terminal device receives the third indication information from the network device, the terminal device uses a codebook of a codebook type used for CQI estimation under the CSI reporting mode without PMI indicated by the third indication information for CQI estimation.

In addition, the first CQI measurement mode may be used in a scenario where a quantity of downlink receiving antennas of the terminal device is equal to a quantity of uplink transmitting antennas. In the scenario, the network device may acquire complete downlink channel information through SRS, so the terminal device may acquire more accurate CQI estimation based on the first CQI measurement mode.

In an example, if the terminal device determines that a CQI measurement mode to be used under the CSI reporting mode without PMI is the second CQI measurement mode, the terminal device performs CQI estimation based on the second CQI measurement mode.

Specifically, a CQI estimation result of the terminal device only reflects downlink interference (the interference also includes a noise part) and does not include information of signal quality. The network device may acquire downlink signal information according to channel reciprocity, and in combination with the interference fed back by the terminal device, obtain final CQI. For example, assuming that interference acquired through interference measurement by the terminal device is $I_{DL}$, a corresponding signal to interference plus noise ratio (SINR)=$1/I_{DL}$, where a value of a channel part is assumed to be 1. The terminal device calculates and reports CQI based on the SINR.

In an example, if the terminal device determines that a CQI measurement mode to be used under the CSI reporting mode without PMI is the third CQI measurement mode, part of the downlink receiving antennas are antennas used by the terminal device to transmit an uplink signal during uplink transmission.

Specifically, if a quantity of uplink transmitting antennas of the terminal device is less than a quantity of downlink receiving antennas, the terminal device may perform CQI estimation only based on downlink channel information corresponding to the uplink transmitting antennas, thus ensuring accuracy of CQI estimation. Therefore, part of the downlink receiving antennas are antennas used by the terminal device to transmit an uplink signal during uplink transmission, i.e., the terminal device does not perform CQI estimation based on channel information on antennas not used for uplink transmission.

In an example, if the terminal device determines that a CQI measurement mode to be used under the CSI reporting mode without PMI is the fourth CQI measurement mode, a specific implementation of performing CQI estimation by the terminal device based on the determined CQI measurement mode to be used under the CSI reporting mode without PMI in the act S202 is: the terminal device performs the CQI estimation based on downlink channel information acquired from a target channel state information reference signal (CSI-RS) port, which is at least one CSI-RS port selected by the terminal device from beamformed CSI-RS ports.

Specifically, the terminal device may also report indication information of the selected target CSI-RS port to the network device, for example, a quantity of target CSI-RS ports may be reported as RI. A quantity of beamformed CSI-RS ports is generally a maximum quantity of transmission layers supported by the terminal device for downlink transmission, a downlink channel acquired by each beamformed CSI-RS port corresponds to an equivalent channel of a downlink transmission layer, and the terminal device acquires the equivalent channel of each downlink transmission layer based on the beamformed CSI-RS ports to estimate channel state information such as CQI and RI.

In an implementation, the method further includes: the terminal device estimates RI based on the determined CQI measurement mode used under the CSI reporting mode without PMI; the terminal device reports the estimated RI; and the network device receives the RI reported from the terminal device.

Specifically, assuming that a CQI measurement mode used under the CSI reporting mode without PMI is the above first CQI measurement mode, the terminal device also performs RI estimation according to the first CQI measurement mode. Assuming that a CQI measurement mode used under the CSI reporting mode without PMI is the above second CQI measurement mode, the terminal device also performs RI estimation according to the second CQI measurement mode, and so on.

Further, RI estimation and CQI estimation are completed in the same estimation process by using the same CQI measurement mode. After the terminal device estimates RI, it also estimates a CQI corresponding to the RI.

Figure 3:
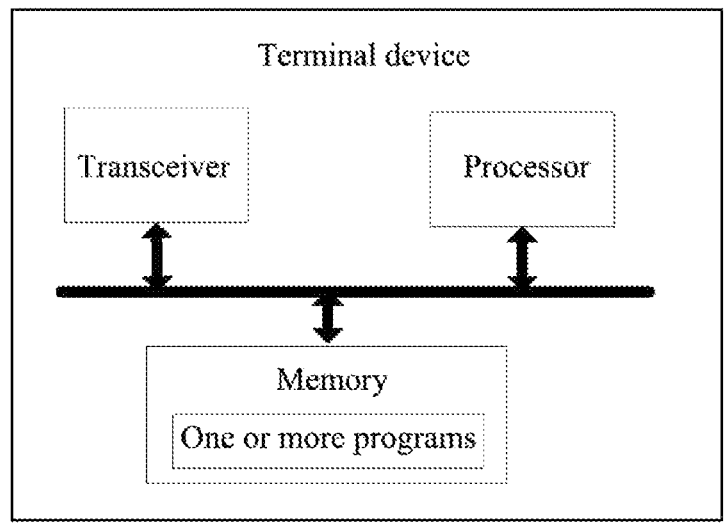
FIG. 3 is a schematic diagram of structure of a terminal device according to an implementation of the present application.

Consistent with the implementation shown in FIG. 2, referring to FIG. 3, FIG. 3 is a schematic diagram of structure of a terminal device according to an implementation of the present application. As shown in FIG. 3, the terminal device includes: one or more processors, one or more memories, one or more transceivers, and one or more programs, wherein the one or more programs are stored in the memories and configured to be executed by the one or more processors, and the one or more programs include instructions used for performing following acts: determining a CQI measurement mode to be used under a CSI reporting mode without PMI; and performing CQI estimation based on the CQI measurement mode, and reporting the estimated CQI to a network device.

In an example, before determining the CQI measurement mode to be used under the CSI reporting mode without PMI, the one or more programs further include instructions for performing following acts: receiving first indication information from the network device, wherein the first indication information is used for indicating use of a CSI reporting mode without PMI; and determining to use the CSI reporting mode without PMI according to the first indication information.

In an example, before determining the CQI measurement mode to be used under the CSI reporting mode without PMI, the one or more programs further include instructions used for performing following acts: receiving second indication information from the network device, wherein the second indication information is used for indicating a CQI measurement mode used for CQI estimation under a CSI reporting mode without PMI; in an aspect of determining the CQI measurement mode to be used under the CSI reporting mode without PMI, the one or more programs include instructions specifically used for performing following acts: determining the CQI measurement mode to be used under the CSI reporting mode without PMI from at least one CQI measurement modes according to the second indication information.

In an example, the CQI measurement mode is: a first CQI measurement mode for CQI estimation based on a precoding matrix in a codebook; a second CQI measurement mode for performing CQI estimation only based on an interference measurement result; a third CQI measurement mode for CQI estimation based on downlink channel information corresponding to a part of downlink receiving antennas; or, a fourth CQI measurement mode for CQI estimation based on a beamformed CSI-RS port.

In an example, if the terminal device determines that the CQI measurement mode to be used under the CSI reporting mode without PMI is the first CQI measurement mode, before performing CQI estimation based on the CQI measurement mode, the one or more programs further include instructions used for performing following acts: receiving third indication information from the network device, wherein the third indication information is used for indicating a codebook type used for CQI estimation under the CSI reporting mode without PMI. In an aspect of performing CQI estimation based on the CQI measurement mode, the one or more programs include instructions specifically used for performing following acts: determining a codebook type used for CQI estimation under a CSI reporting mode without PMI reporting from at least one predefined codebook type according to the third indication information; and performing CQI estimation according to a codebook of the codebook type.

In an example, if the terminal device determines that the CQI measurement mode to be used under the CSI reporting mode without PMI is the first CQI measurement mode, before performing CQI estimation based on the CQI measurement mode, the one or more programs further include instructions used for performing following acts: receiving fourth indication information from the network device, wherein the fourth indication information is used for indicating a codebook used for CQI estimation under a CSI reporting mode without PMI in a specified codebook type. In an aspect of performing CQI estimation based on the CQI measurement mode, the one or more programs include instructions specifically used for performing following acts: determining a codebook used for CQI estimation under a CSI reporting mode without PMI reporting from the specified codebook type according to the fourth indication information; and performing CQI estimation according to the codebook.

In an example, if the terminal device determines that the CQI measurement mode to be used under the CSI reporting mode without PMI is the first CQI measurement mode, in an aspect of performing CQI estimation based on the CQI measurement mode, the one or more programs include instructions specifically used for performing following acts: performing CQI estimation according to a target codebook or a subset of the target codebook, wherein the target codebook is a codebook used by the terminal device for CSI measurement under the CSI reporting mode with PMI reporting.

In an example, part of downlink receiving antennas is antennas used by the terminal device to transmit an uplink signal during uplink transmission.

In an example, if the terminal device determines that the CQI measurement mode to be used under the CSI reporting mode without PMI is the fourth CQI measurement mode, in an aspect of performing CQI estimation based on the CQI measurement mode, the one or more programs include instructions specifically used for performing following acts: performing CQI estimation based on downlink channel information acquired from a target CSI-RS port, wherein the target CSI-RS port is at least one CSI-RS port selected by the terminal device from beamformed CSI-RS ports.

In an example, the one or more programs further include instructions used for performing following acts: estimating RI based on the determined CQI measurement mode used under the CSI reporting mode without PMI; and reporting the estimated RI.

It should be noted that specific implementations of the contents described in the implementation may refer to the above method and will not be described here.

Figure 4:
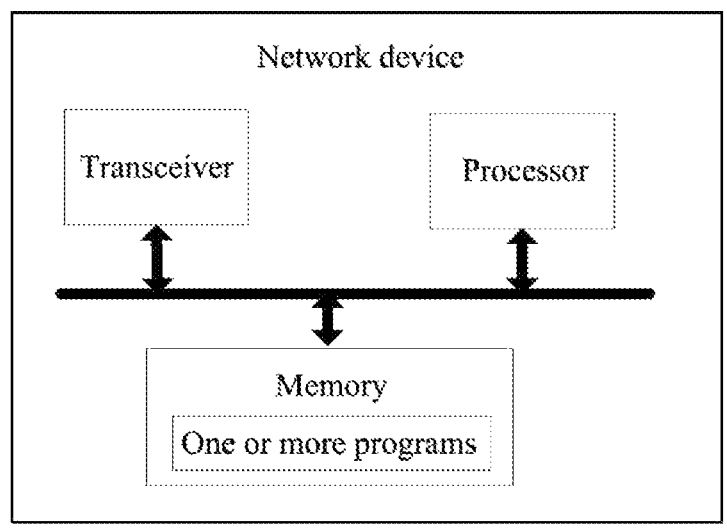
FIG. 4 is a schematic diagram of structure of a network device according to an implementation of the present application.

Consistent with the implementation shown in FIG. 2, referring to FIG. 4, FIG. 4 is a schematic diagram of structure of a network device according to an implementation of the present application. As shown in FIG. 4, the network device includes: one or more processors, one or more memories, one or more transceivers, and one or more programs, wherein the one or more programs are stored in the memories and configured to be executed by the one or more processors, and the one or more programs include instructions used for performing following acts: receiving channel quality indicator (CQI) reported from a terminal device, wherein the CQI is acquired by the terminal device performing CQI estimation according to a CQI measurement mode under a CSI reporting mode without precoding matrix indicator (PMI).

In an example, before receiving the CQI reported from the terminal device, the programs include instructions used for further performing following acts: sending first indication information to the terminal device, wherein the first indication information is used for indicating use of a CSI reporting mode without PMI.

In an example, before receiving the CQI reported from the terminal device, the one or more programs include instructions used for further performing following acts: sending second indication information to the terminal device, wherein the second indication information is used for indicating a CQI measurement mode used for CQI estimation under a CSI reporting mode without PMI.

In an example, the CQI measurement mode includes at least one of: 1) a first CQI measurement mode for CQI estimation based on a precoding matrix in a codebook; 2) a second CQI measurement mode for CQI estimation only based on an interference measurement result; 3) a third CQI measurement mode for CQI estimation based on downlink channel information corresponding to part of downlink receiving antennas; 4) a fourth CQI measurement mode for CQI estimation based on a beamformed CSI-RS port.

In an example, if the terminal device determines that the CQI measurement mode to be used under the CSI reporting mode without PMI is the first CQI measurement mode, before receiving the CQI reported from the terminal device, the one or more programs include instructions used for further performing following acts: sending third indication information to the terminal device, wherein the third indication information is used for indicating a codebook type used for CQI estimation under a CSI reporting mode without PMI.

In an example, if the terminal device determines that the CQI measurement mode to be used under the CSI reporting mode without PMI is the first CQI measurement mode, before receiving the CQI reported from the terminal device, the one or more programs include instructions used for further performing following acts: sending fourth indication information to the terminal device, wherein the fourth indication information is used for indicating a codebook used for CQI estimation under a CSI reporting mode without PMI in a specified codebook type.

In an example, the one or more programs include instructions further used for performing following acts: receiving rank indication (RI) reported from the terminal device, wherein the RI is estimated by the terminal device based on a CQI measurement mode used under a CSI reporting mode without PMI.

It should be noted that specific implementations of the contents described in the implementation may refer to the above mode and will not be described here.

The foregoing describes the solutions provided in the implementations of the present application mainly from a perspective of interaction between network elements. It may be understood that in order to achieve the functions, a communication device may include corresponding hardware structures and/or software modules to perform corresponding functions. Those skilled in the art may easily realize that in connection with the units and algorithm actions of the examples described in the implementations disclosed herein, the present application may be implemented in a form of hardware or a combination of the hardware and computer software. Whether a function is performed by hardware or computer software driving hardware depends on a particular application and a design constraint condition of the technical solution. Professional technicians may use different methods to implement the described functions for each particular application, but such implementation should not be considered beyond the scope of the present application.

Division for functional units can be performed for a terminal device and a network device in the implementations of the present application according to the above method examples. For example, various functional units may be divided according to various functions, or two or more functions can be integrated into one processing unit. The aforementioned integrated unit may be implemented in a form of hardware, or may be implemented in a form of a software program module. It should be noted that, the division of the units in the implementations of the present application is illustrative, and is merely the division of logical functions. Other division modes may be used in actual implementations.

Figure 5:
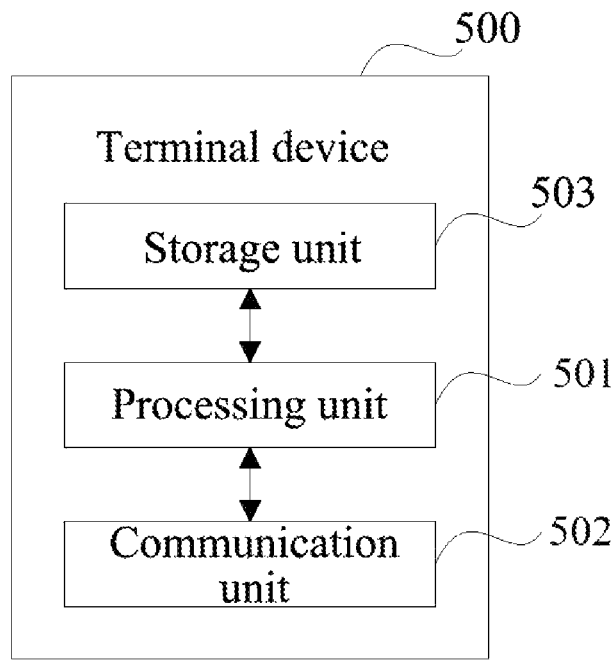
FIG. 5 is a schematic diagram of structure of another terminal device according to an implementation of the present application.

In a case that an integrated unit or module is used, FIG. 5 illustrates a block diagram of possible composition of functional units of a terminal device related to the implementations. The terminal device 500 includes a processing unit 501, a communication unit 502, and a storage unit 503. The processing unit 501 is configured to control and manage actions of the terminal device, the communication unit 502 is configured to support communications between the terminal device and other devices, and the storage unit 503 is configured to store program codes and data of the communication device. It should be noted that the processing unit 501, the communication unit 502, and the storage unit 503 are configured to support the acts performed in the above methods, and will not be described here.

The processing unit 501 may be a processor or a controller such as a Central Processing Unit (CPU), a general purpose processor, a Digital Signal Processor (DSP), an Application-Specific Integrated Circuit (ASIC), a Field Programmable Gate Array (FPGA), or other programmable logic device, transistor logic device, hardware component, or any combination thereof. The processing unit 501 may implement or execute the various illustrative logical blocks, modules, and circuits described in combination with disclosed contents of the present application. The processor may also be a combination for implementing computing functions, e.g., a combination including one or more microprocessors, a combination of a DSP and a microprocessor. The communication unit 502 may be a transceiver, a transceiving circuit, or a radio frequency chip, etc. The storage unit 503 may be a memory.

When the processing unit 501 is a processor, the communication unit 502 is a communication interface, and the storage unit 503 is a memory, the communication device of the implementation of the present application may be the terminal device shown in FIG. 3.

Figure 6:
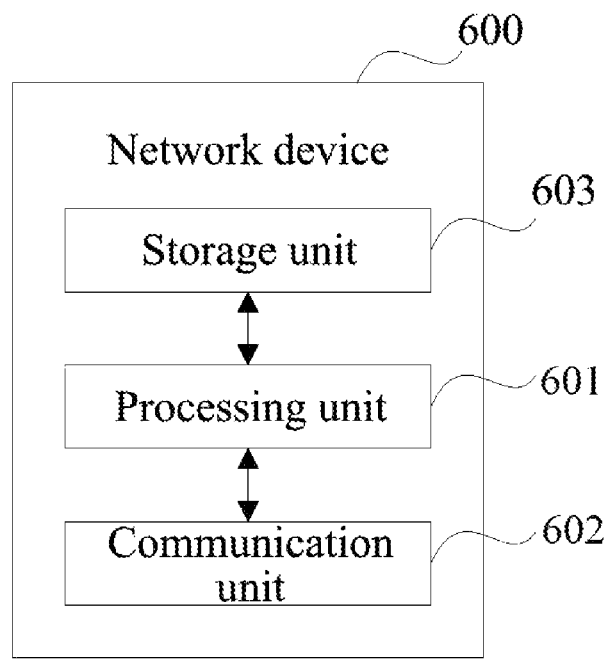
FIG. 6 is a schematic diagram of structure of another network device according to an implementation of the present application.

In a case that an integrated unit or module is used, FIG. 6 illustrates a block diagram of possible composition of functional units of a network device related to the above implementations. The network device 600 includes a processing unit 601, a communication unit 602, and a storage unit 603. The processing unit 601 is configured to control and manage actions of the network device, the communication unit 602 is configured to support communications between the network device and other devices, and the storage unit 603 is configured to store program codes and data of the communication device. It should be noted that the processing unit 601, the communication unit 602, and the storage unit 603 are configured to support the acts performed in the above methods, and will not be described here.

The processing unit 601 may be a processor or a controller such as a Central Processing Unit (CPU), a general purpose processor, a Digital Signal Processor (DSP), an Application-Specific Integrated Circuit (ASIC), a Field Programmable Gate Array (FPGA), or other programmable logic device, transistor logic device, hardware component, or any combination thereof. The processing unit 601 may implement or execute the various illustrative logical blocks, modules, and circuits described in combination with disclosed contents of the present application. The processor may also be a combination for implementing computing functions, e.g., a combination including one or more microprocessors, a combination of a DSP and a microprocessor. The communication unit 602 may be a transceiver, a transceiving circuit, or a radio frequency chip, etc. The storage unit 603 may be a memory.

When the processing unit 601 is a processor, the communication unit 602 is a communication interface, and the storage unit 603 is a memory, the communication device of the implementation of the present application may be the network device shown in FIG. 4.

Figure 7:
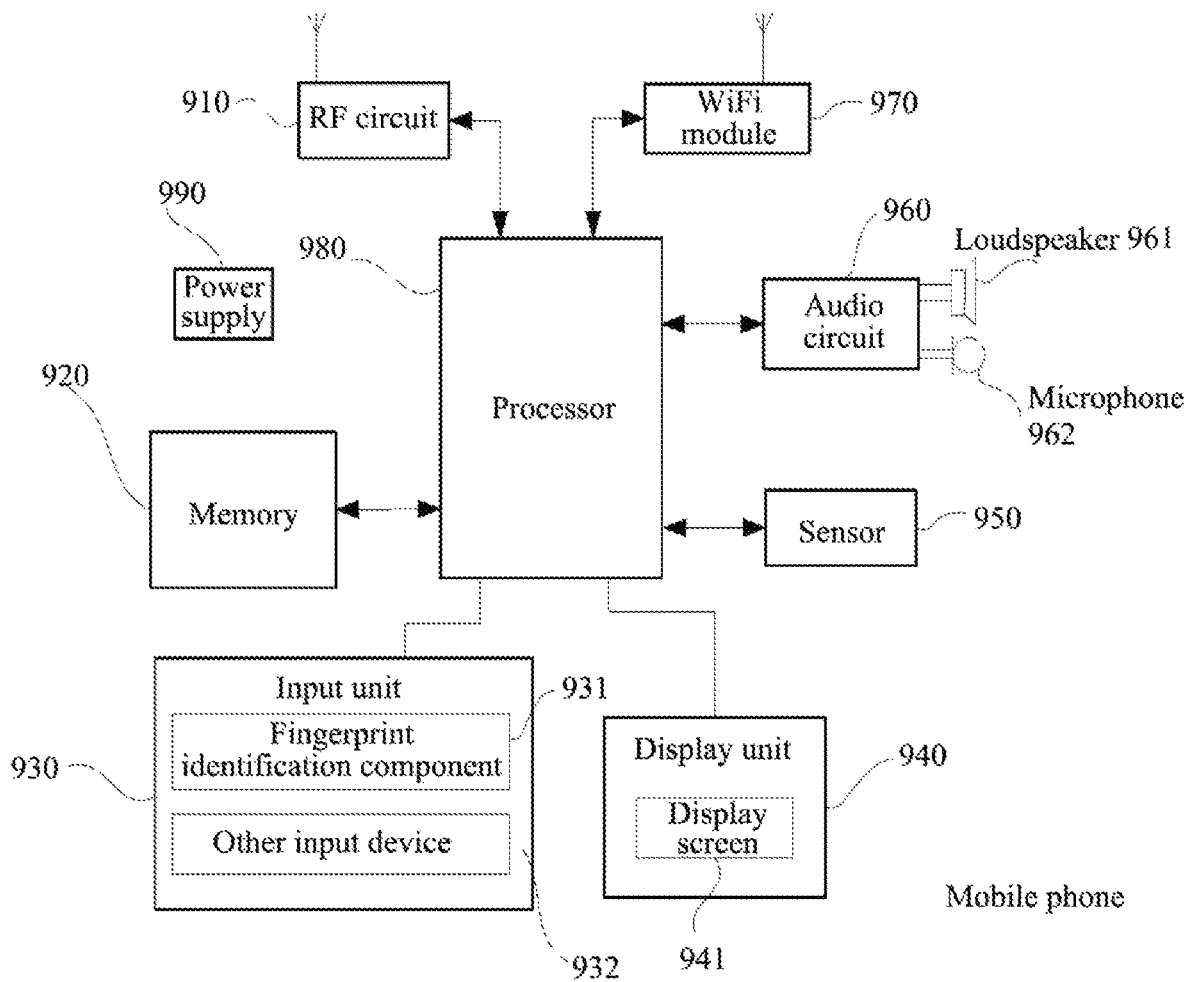
FIG. 7 is a schematic diagram of structure of another terminal device according to an implementation of the present application.

Another terminal device is further provided in an implementation of the present application. As illustrated in FIG. 7, for ease of illustration, only parts related to implementations of the present application are shown, and specific technical details which are not illustrated may refer to part of the methods according to the implementations of the present application. The terminal device may be a mobile phone, a tablet computer, a Personal Digital Assistant (PDA), a Point of Sales (POS), a vehicle-mounted computer, or any other terminal device. A mobile phone is taken as an example of the terminal device in following contents.

FIG. 7 is a block diagram of partial structure of a mobile phone related to a terminal device provided by an implementation of the present application. Referring to FIG. 7, the mobile phone includes parts such as a radio frequency (RF) circuit 910, a memory 920, an input unit 930, a display unit 940, a sensor 950, an audio circuit 960, a wireless fidelity (WiFi) module 970, a processor 980, and a power supply 990. A person skilled in the art may understand that the structure of the mobile phone shown in FIG. 7 does not constitute a limitation to the mobile phone, and the mobile phone may include more parts or fewer parts than those shown in the figure, or some parts may be combined, or a different part arrangement may be used.

In the following, each composition part of the mobile phone is specifically described with reference to FIG. 7.

The RF circuit 910 may be used to receive and send information. Generally, the RF circuit 910 includes, but is not limited to, an antenna, at least one amplifier, a transceiver, a coupler, a low noise amplifier (LNA), a duplexer, and the like. In addition, the RF circuit 910 may further communicate with a network and another device via wireless communication. The wireless communication may use any communication standard or protocol, which includes, but is not limited to, a Global System for Mobile Communication (GSM), a General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 920 may be used for storing software programs and modules, and the processor 980 executes various functional applications and data processing of the mobile phone by running the software programs and modules stored in the memory 920. The memory 920 may mainly include a program storage area and a data storage area, wherein the program storage area may store an operating system, a computer program required for at least one function, and the like. The data storage area may store data or the like, created according to the use of the mobile phone. In addition, the memory 920 may include a high-speed random access memory, and may also include a non-volatile memory, such as at least one magnetic disk storage device, a flash memory, or other volatile solid-state storage device.

The input unit 930 may be configured to receive input digital or character information, and generate key signal inputs related to user settings and function control of the mobile terminal. Specifically, the input unit 930 may include a fingerprint identification component 931 and other input device 932. The fingerprint identification component 931 may collect fingerprint data inputted by the user thereon. Besides the fingerprint identification component 931, the input unit 930 may further include other input device 932. Specifically, the other input devices 932 may include, but is not limited to, one or more of a touch control screen, a physical keyboard, a function key (for example, a volume control key, or a switch key), a track ball, a mouse, a joystick, and so on.

The display unit 940 may be used for displaying information input by the user or information provided for the user, and various menus of the mobile phone. The display unit 940 may include a display screen 941. Optionally, the display screen 941 may be configured by a liquid crystal display (LCD), an organic light-emitting diode (OLED), or the like. Although the fingerprint identification component 931 and the display screen 941 in FIG. 7 are used as two separate parts to realize input and input function of the mobile phone, but in some implementations, the fingerprint identification component 931 and the display screen 941 may be integrated to realize the input function and playing function of the mobile phone.

The mobile phone may further include at least one sensor 950, such as an optical sensor, a motion sensor or other sensor. Specifically, the optical sensor may include an ambient light sensor and a proximity sensor, where the ambient light sensor may adjust the luminance of the display screen 941 according to brightness of the ambient light, and the proximity sensor may turn off the display screen 941 and/or backlight when the mobile phone is moved to the ear. As one type of the motion sensor, an acceleration sensor may detect the magnitudes of accelerations in various directions (generally triaxial), may detect the magnitude and direction of the gravity when it is still, may be used in an application for identifying a gesture of a mobile phone (for example, switching between landscape and portrait, related games, and gesture calibration of a magnetometer), and a function related to vibration identification (such as a pedometer and a tap) etc. Other sensors, for example, a gyroscope, a barometer, a hygrometer, a thermometer, and an infrared sensor, which may be configured in the mobile phone are not further described herein.

An audio circuit 960, a loudspeaker 961, and a microphone 962 may provide audio interfaces between the user and the mobile phone. The audio circuit 960 may transmit an electrical signal converted from the received audio data to the speaker 961, and the speaker 961 may convert the electrical signal into a sound signal for playing. On the other hand, the microphone 962 converts the collected sound signal into the electrical signal, which are received by the audio circuit 960 and then converted into audio data. After being processed by the audio data playback processor 980, the audio data is sent to another mobile phone via the RF circuit 910, or the audio data is played to the memory 920 for further processing.

WiFi belongs to a short-range wireless transmission technology. The mobile phone may help the user to send and receive an e-mail, browse web page and access streaming media and the like through the WiFi module 970. The WiFi module 970 provides the user with wireless broadband Internet access. Although FIG. 7 shows the WiFi module 970, it may be understood that, the WiFi module 970 is not an essential part of the mobile phone, and may be completely omitted as required without changing the essence of the present application.

The processor 980 is a control center of the mobile phone, and connects various parts of the whole mobile phone by using various interfaces and circuits. By running or executing software programs and/or modules stored in the memory 920 and invoking data stored in the memory 920, the processor 980 performs various functions of the mobile phone and processes data, thereby performing overall monitoring on the mobile phone. Optionally, the processor 980 may include one or multiple processing units. Preferably, the processor 980 may integrate an application processor and a modulation and demodulation processor. The application processor mainly processes an operating system, a user interface, an application program, and so on, and the modulation and demodulation processor mainly processes wireless communication. It may be understood that, the above modulation and demodulation processor may be not integrated into the processor 980.

The mobile phone further includes a power supply 990 (such as a battery) for supplying power to each part. Preferably, the power supply may be logically connected to the processor 980 by using a power management system, thereby functions such as charging, discharging, and power consumption management is implemented by using the power management system.

Although not shown in the figure, the mobile phone may further include a camera, a Bluetooth module, and the like, which are not further described herein.

In the above implementation shown in FIG. 2, the flow at the terminal device side in each act of the method may be implemented based on the structure of the mobile phone.

In the above implementation shown in FIG. 5, the function of each unit may be implemented based on the structure of the mobile phone.

An implementation of the present application also provides a computer readable storage medium. The computer readable storage medium stores a computer program for electronic data interchange, wherein the computer program enables a computer to execute parts or all of the acts described for the terminal device in the above method implementations.

An implementation of the present application also provides a computer readable storage medium. The computer readable storage medium stores a computer program for electronic data interchange, and the computer program enables a computer to execute parts or all of the acts described for the network device in the above method implementations.

An implementation of the present application also provides a computer program product, wherein the computer program product includes a non-transitory computer readable storage medium storing a computer program, and the computer program is operable to enable a computer to execute parts or all of the acts described for the terminal device in the above method. The computer program product may be a software installation package.

An implementation of the present application also provides a computer program product. The computer program product includes a non-transitory computer readable storage medium storing a computer program, and the computer program is operable to enable a computer to execute parts or all of the acts described for the network device in the above method implementations. The computer program product may be a software installation package.

The acts of the method or algorithm described in the implementations of the present application may be implemented in hardware or may be implemented by a processor executing software instructions. The software instructions may be composed by corresponding software modules. The software modules may be stored in a Random Access Memory (RAM), a flash memory, a Read Only Memory (ROM), an Erasable Programmable Read Only Memory (EPROM), an Electrically Erasable Programmable Read Only Memory (EEPROM), a register, a hard disk, a removable hard disk, a Compact Disc Read-Only Memory (CD-ROM), or a storage medium in any other form well-known in the art. An example storage medium is coupled to the processor such that the processor may read information from a storage medium, and write information to the storage medium. Of course, the storage medium may be a component of the processor. The processor and the storage medium may be located in an ASIC. In addition, the ASIC may be located in an access network device, a target network device, or a core network device. The processor and the storage medium may also act as separate components in the access network device, the target network device, or the core network device.

Those skilled in the art should realize that in one or more examples described above, the functions described in the implementations of the present application may be implemented in whole or in parts through software, hardware, firmware, or any combination thereof. When the functions described in the implementations of the present application are implemented through software, these functions may be implemented in whole or in parts in the form of a computer program product. The computer program product includes one or more computer instructions. When the computer program instructions are loaded and executed on a computer, the processes or functions are generated in whole or in parts according to the implementations of the present application. The computer may be a general purpose computer, a special purpose computer, a computer network, or other programmable devices. The computer instructions may be stored in a computer-readable storage medium, or transmitted from one computer-readable storage medium to another computer-readable storage medium, for example, the computer instructions may be transmitted from a website site, a computer, a server, or a data center to another website site, computer, server, or data center through a wired method (e.g., a coaxial cable, an optical fiber, a digital subscriber line (DSL)) or a wireless method (e.g., infrared radiation, radio, microwave, etc). The computer-readable storage medium may be any available medium that the computer may access, or a data storage device such as an integrated server or data center that includes one or more available media. The available medium may be a magnetic medium (e.g., a floppy disk, a hard disk, a magnetic tape), an optical medium (e.g., a digital video disc (DVD)), or a semiconductor medium (e.g., a solid state disk (SSD)), or the like.

The specific implementations described above have further explained in detail the purpose, technical solutions and beneficial effects of the implementations of the present application. It should be understood that the above is only the specific implementations of the implementations of the present application and is not intended to limit the protection scope of the implementations of the present application. Any modification, equivalent substitution, improvement, etc. made on the basis of the technical solutions of the implementations of the present application shall be included in the protection scope of the implementations of the present application.

What is claimed is:

1. A method for reporting channel state information (CSI), comprising:
   receiving, by a terminal device, first indication information from a network device, wherein the first indication information is used for indicating to use a CSI reporting mode without precoding matrix indicator (PMI);
   determining, by the terminal device, to use the CSI reporting mode without PMI according to the first indication information;
   determining, by the terminal device, a channel quality indicator (CQI) measurement mode to be used under the CSI reporting mode without PMI; and
   performing, by the terminal device, CQI estimation based on the CQI measurement mode and reporting an estimated CQI to the network device;
   wherein the CQI measurement mode is a CQI estimation based on a plurality of beamformed channel state information reference signal (CSI-RS) ports, and performing, by the terminal device, the CQI estimation based on the CQI measurement mode comprises:
   performing, by the terminal device, the CQI estimation based on downlink channel information acquired at least two CSI-RS ports selected by the terminal device from the plurality of beamformed CSI-RS ports.

2. The method according to claim 1, wherein the method further comprises:
   before the terminal device determines the CQI measurement mode to be used under the CSI reporting mode without PMI:
   receiving, by the terminal device, second indication information from the network device, wherein the second indication information is used for indicating the CQI measurement mode used for the CQI estimation under the CSI reporting mode without PMI; and
   wherein determining, by the terminal device, the CQI measurement mode to be used under the CSI reporting mode without PMI, comprises: determining, by the terminal device, the CQI measurement mode to be used under the CSI reporting mode without PMI from at least one CQI measurement mode according to the second indication information.

3. The method according to claim 1, wherein the method further comprises:
   estimating, by the terminal device, rank indication (RI) based on the determined CQI measurement mode used under the CSI reporting mode without PMI; and
   reporting, by the terminal device, the estimated RI.

4. A method for reporting channel state information (CSI), comprising:
   sending, by a network device, first indication information to a terminal device, wherein the first indication information is used for indicating to use a CSI reporting mode without precoding matrix indicator (PMI); and
   receiving, by the network device, a channel quality indicator (CQI) reported from the terminal device, wherein the CQI is acquired by the terminal device through performing CQI estimation according to a CQI measurement mode under the CSI reporting mode without PMI;

wherein the CQI measurement mode is a CQI estimation based on a plurality of beamformed CSI-RS ports, and the CQI is acquired by the terminal device through performing CQI estimation based on downlink channel information acquired from at least two CSI-RS ports selected by the terminal device from the plurality of beamformed CSI-RS ports.

5. The method according to claim 4, wherein the method further comprises:
before the network device receives the CQI reported from the terminal device,
sending, by the network device, second indication information to the terminal device, wherein the second indication information is used for indicating the CQI measurement mode used for the CQI estimation under the CSI reporting mode without PMI.

6. The method according to claim 4, wherein the method further comprises:
receiving, by the network device, rank indication (RI) reported from the terminal device, wherein the RI is estimated by the terminal device based on the CQI measurement mode used under the CSI reporting mode without PMI.

7. A terminal device, comprising one or more processors, one or more memories, one or more transceivers, and one or more programs; wherein the one or more programs are stored in the one or more memories and configured to be executed by the one or more processors, and the one or more programs comprise instructions for executing acts of:
receiving first indication information from a network device, wherein the first indication information is used for indicating to use a channel state information (CSI) reporting mode without precoding matrix indicator (PMI);
determining to use the CSI reporting mode without PMI according to the first indication information;
determining a channel quality indicator (CQI) measurement mode to be used under the CSI reporting mode without PMI; and
performing CQI estimation based on the CQI measurement mode and reporting an estimated CQI to the network device;
wherein the CQI measurement mode is a CQI estimation based on a plurality of beamformed channel state information reference signal (CSI-RS) ports, and performing the CQI estimation based on the CQI measurement mode comprises:
performing, by the terminal device, the CQI estimation based on downlink channel information acquired from at least two CSI-RS ports selected by the terminal device from the plurality of beamformed CSI-RS ports.

8. A network device, comprising one or more processors, one or more memories, one or more transceivers, and one or more programs; wherein the one or more programs are stored in the one or more memories and configured to be executed by the one or more processors, and the one or more programs comprise instructions for executing an act of:
sending first indication information to a terminal device, wherein the first indication information is used for indicating to use a channel state information (CSI) reporting mode without precoding matrix indicator (PMI); and
receiving a channel quality indicator (CQI) reported from the terminal device, wherein the CQI is acquired by the terminal device through performing CQI estimation according to a CQI measurement mode under the CSI reporting mode without PMI;
wherein the CQI measurement mode is a CQI estimation based on a plurality of beamformed CSI-RS ports, and the CQI is acquired by the terminal device through performing CQI estimation based on downlink channel information acquired from at least two CSI-RS ports selected by the terminal device from the plurality of beamformed CSI-RS ports.

* * * * *